United States Patent [19]
Gresens

[11] 3,908,930
[45] Sept. 30, 1975

[54] ADJUSTABLE DRIVE MECHANISM FOR A MOTION PICTURE CAMERA

[75] Inventor: Robert I. Gresens, Rochester, N.Y.

[73] Assignee: Eastman Kodak Company, Rochester, N.Y.

[22] Filed: Feb. 4, 1974

[21] Appl. No.: 438,990

[52] U.S. Cl.................. 242/197; 242/207; 352/78 C
[51] Int. Cl.² ................... G03B 1/04; G11B 15/32; G11B 23/04
[58] Field of Search .......... 242/197, 198, 205, 207, 242/210, 194, 68.3, 71.1, 71.2; 352/78 C, 78 R, 72

[56] References Cited
UNITED STATES PATENTS
2,721,040  10/1955  Grantham ........................... 242/207
2,973,913  3/1961  Thevenaz ............................ 242/207
3,494,528  2/1970  Suzuki et al. ..................... 242/180 R FOREIGN PATENTS OR APPLICATIONS
1,222,370  8/1966  Germany ........................... 352/78 C Primary Examiner—Leonard D. Christian
Attorney, Agent, or Firm—J. Morrow

[57] ABSTRACT

A drive mechanism for a motion picture camera or the like can supply either of the two different driving forces required for advancing film strips in two types of cartridges. The required force is supplied automatically in response to sensing of a coded portion of the cartridge.

10 Claims, 4 Drawing Figures

ADJUSTABLE DRIVE MECHANISM FOR A MOTION PICTURE CAMERA

CROSS-REFERENCE TO RELATED APPLICATIONS

Reference is hereby made to commonly-assigned copending U.S. Patent application Ser. No. 336,863, entitled, DOOR ASSEMBLY FOR MOTION PICTURE CAMERA, filed Feb. 28, 1973, in the name of H. H. Dudley et al.; commonly-assigned copending U.S. Patent application Ser. No. 411,125, entitled, DESIGN FOR FILM CARTRIDGE, filed Oct. 31, 1973, in the name of H. H. Dudley et al.; commonly-assigned copending U.S. Patent application Ser. No. 451,640, entitled, FILM CARTRIDGE AND ASSOCIATED DRIVE MEANS, filed March 15, 1974, in the name of Chandler et al.; commonly-assigned copending U.S. Patent application Ser. No. 250,352, entitled, DISABLING DEVICE FOR ANTI-BACKUP MECHANISM IN A FILM CARTRIDGE, filed May 4, 1972, in the name of Holzhauser et al.; now U.S. Pat. No. 3,860,195; and commonly-assigned copending U.S. Patent application Ser. No. 248,514, entitled, FILM CARTRIGE, filed Apr. 28, 1972 in the name of Stephen H. Miller.

BACKGROUND OF THE INVENTION

1. Field Of The Invention

This invention relates to a drive mechanism for a motion picture camera, projector or the like. More particularly, the invention relates to a drive mechanism adapted to provide different driving forces for advancing a film in each of two types of received film cartridges; the required driving force supplied for each cartridge type by the drive mechanism being determined automatically by a portion of the drive mechanism sensing a coded portion of the received cartridge.

Description Of The Prior Art

A common type of super 8 film cartridge is a 50 foot silent cartridge which is described in commonly-assigned U.S. Pat. No. 3,208,686, issued Sept. 28, 1965, in the name of E. A. Edwards et al. Due to the structure of this type of cartridge, a driving torque must be supplied to a film advancing portion of the cartridge by a camera drive mechanism to properly advance the film. The film advancing portion of the cartridge referred to here is the take-up core on which film is wound when it enters the take-up chamber of the camera. For this type cartridges loaded with many conventional films, the driving torque may be anywhere in the range of 0.5 to 1.5 inch-ounces. However, for some "slippery" films the torque to be applied preferably is in the lower-half of this range (i.e., 0.5 to 1.0 inch-ounces). When "slippery" film is loaded into the cartridge and a torque over 1.0 inch-ounces is applied, the film is subject to "pull-through," i.e., the torque applied to the take-up core causes some advancement of film in the area of the exposure aperture. When such film is projected, the images are unsteady. It is believed that this "pull-through" of "slippery" film can be substantially avoided by keeping the torque applied to the take-up core within a range of 0.5 to 1.0 inch-ounces.

A very common camera drive mechanism for supplying a substantially constant driving torque that falls within the desired operating range is a friction drive of a type which includes a driven portion and a drive portion which are frictionally coupled by a slip clutch member. As is well known, such a friction drive is economical to manufacture and provides reliable operation for advancing the film in the cartridge.

Two new types of film cartridges are disclosed generally in commonly-assigned U.S. Pat. No. 3,782,812 issued Jan. 1, 1974 in the name of T. W. Roller, and in U.S. Pat. No. 3,767,294 issued Oct. 23, 1973 in the name of G. J. Kosarko, and in the before-mentioned copending U.S. Pat. application Ser. Nos. 248,514 and 411,125. These cartridges are suitable for supporting a 50 foot length of sound film and a 200 foot length of sound or silent film, respectively. In view of these new film cartridges, it is desirable to provide a single motion picture camera adapted to accommodate interchangeably either the new, larger-capacity cartridge or one (or both) of the smaller capacity cartridges. The 50 foot sound cartridge is designed to operate within the same range of torque forces as the 50 foot silent cartridge; however, for the larger capacity cartridge, a torque range of 1.0 to 1.5 inch-ounces is preferred. Therefore, aside from the requisite changes in the camera structure to accept the larger physical dimensions of the two new types of cartridges, it is desirable to provide a driving member which selectively furnishes one driving torque in a low range (0.5 to 1.0 inch-ounces) to the smaller-capacity cartridges and a second torque in a higher range (1.0 to 1.5 inch-ounces) to the larger-capacity film cartridge. In addition, it is desirable to produce a friction drive which will sense the type of cartridge received and will automatically shift the operation of the friction drive to the desired operating range.

SUMMARY OF THE INVENTION

An object of the present invention is to provide a drive mechanism for a motion picture camera, projector or the like such that the camera is adjustable for operation with different sizes of rolls of film or film cartridges and capable of providing each of the different driving forces required for advancing the film.

A further object of the present invention is to provide a drive mechanism adapted to automatically provide different driving forces as required by different sizes of film rolls or cartridges.

Another object of the present invention is to provide a drive mechanism which automatically determines and supplies the driving force required to satisfactorily operate a received film cartridge in a motion picture camera.

In accordance with the present invention, a motion picture camera or the like includes a drive mechanism for selectively applying either a first driving force or a second and larger driving force to a film advancing portion of a received film cartridge in response to the sensing of means of the cartridge indicating whether a first or second driving force is required.

BRIEF DESCRIPTION OF THE DRAWINGS

In the detailed description of the preferred embodiment of the invention presented below, reference is made to the accompanying drawings in which.

DESCRIPTION OF THE PREFERRED EMBODIMENT

Figure 1:
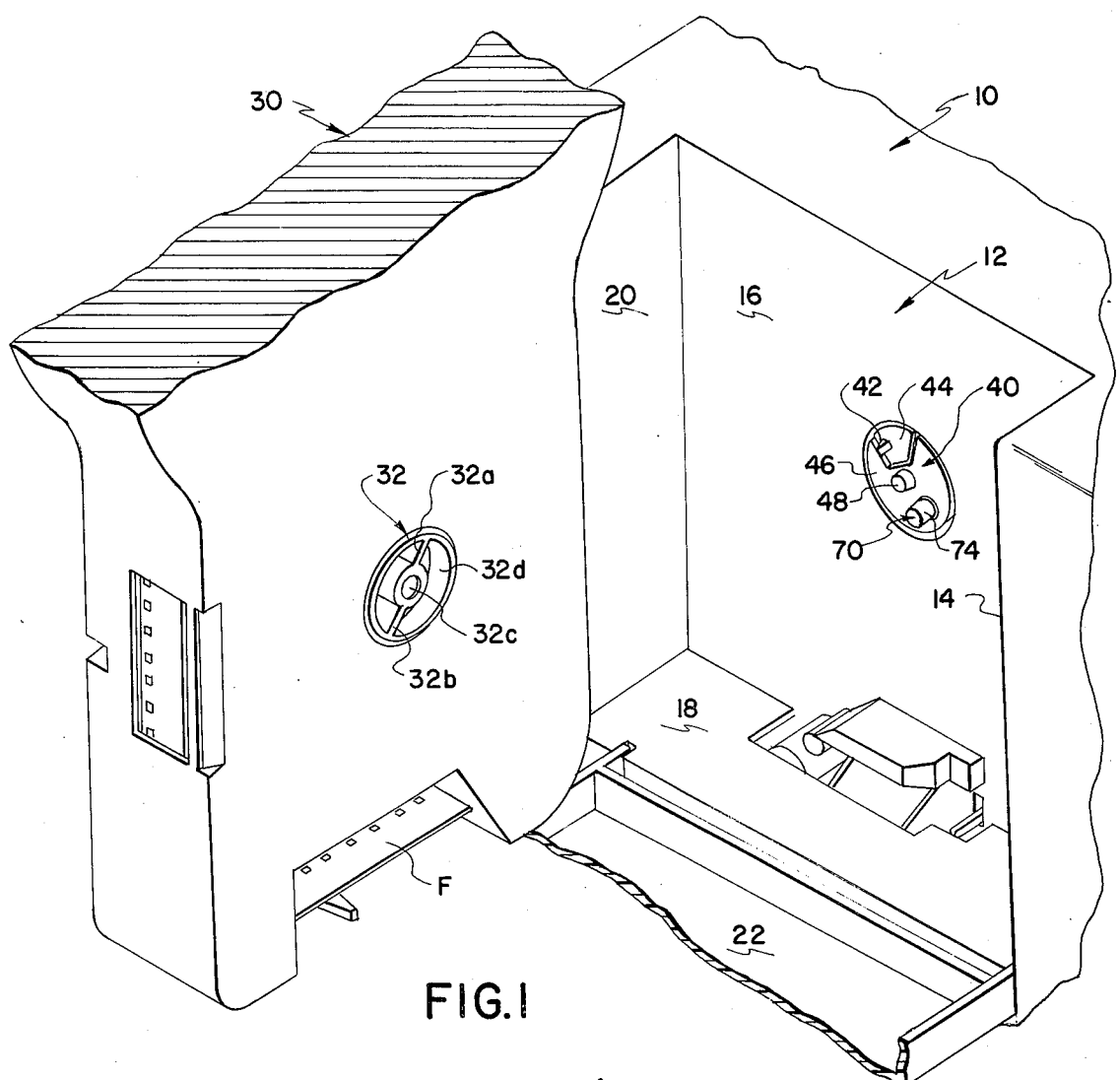
FIG. 1 is a fragmentary perspective view with parts broken away showing a sound motion picture camera incorporating a take-up drive mechanism of the present invention and showing part of a film cartridge of a type suitable for use with the camera.

Because motion picture cameras and film cartridges are well known, the present description will be directed in particular to elements forming part of, or cooperating more directly with, the present invention, apparatus not specifically shown or described herein being understood to be selectable from those known in the art.

The portion of a motion picture camera 10 depicted in the drawings includes a cartridge chamber 12 partially defined by walls 14, 16, 18 and 20 which are adapted to mate with either a portion of a received film cartridge or with the edges of the cover 22 to enclose the cartridge chamber 12 in a light-tight manner. This is described in more detail in commonly-assigned copending U.S. Pat. application Ser. No. 336,863, entitled, DOOR ASSEMBLY FOR MOTION PICTURE CAMERA, filed Feb. 28, 1973, in the name of Dudley et al. A preferred embodiment of the motion picture camera 10 is adapted to receive one of several types of film cartridges, including a relatively large film cartridge 30 which contains a relatively long length of film (e.g., film lengths of about 200 feet). The ornamental appearance of a film cartridge of this type is disclosed in commonly-assigned copending U.S. Pat. application Ser. No. 411,125, entitled, DESIGN FOR FILM CARTRIDGE, filed Oct. 31, 1973, in the name of Dudley et al.; and in commonly-assigned copending U.S. Pat. application Ser. No. 451,640, entitled, FILM CARTRIDGE AND ASSOCIATED DRIVE MEANS, filed Mar. 15, 1974, in the name of Chandler et al. The film cartridge 30 preferably includes a core or film drive member 32 having lugs 32a and 32b which project radially from diametrically opposite portions of a center hub portion 32c. The lugs 32a and 32b span a recessed portion 32d of the drive member 32. The lugs 32a and 32b are engageable with a drive lug 42 of a drive mechanism 40 of the camera 10 when the cartridge 30 is correctly inserted into the cartridge chamber 12. Drive lug 42 applies a driving force to either of the lugs 32a, 32b for rotatably driving member 32. Rotation of member 32 advances a film strip F through the cartridge 30.

The camera drive lug 42 extends from an irregularly shaped plate 44 which fits into another irregularly shaped plate 46. Jointly, the plates define a cylindrical portion of the drive mechanism 40 that is mounted within a complementary recess 62 in a gear member 60. A washer-shaped friction clutch member 64 is positioned in the recess 62 of the gear 60 between the circular inner surface 60a of the recess and the surfaces 44a and 46a of plates 44 and 46, respectively. The clutch plate 64 is frictionally engageable with the surface 44a, 46a and 60a. Thus, when gear 60 is rotatably driven by a drive motor (schematically shown in FIG. 2), a driving force is transmitted to the film drive member 42 by the frictional engagement of the clutch plate 64 with the surface 60a and the surfaces 44a and 46a. The actual force transmitted to a cartridge by lug 42 can vary; however, for a camera adapted to receive a super 8 cartridge (such as disclosed in the before-mentioned U.S. Pat. No. 3,208,686) the driving force preferably is in the range of 0.5 to 1.0 inch-ounces, and most preferably is about 0.7 to 0.8 inch-ounces. While such a driving force is satisfactory for advancing the film in cartridges containing relatively short lengths of film (e.g., 50 feet), it has been found desirable to provide a driving force in the range of 1.0 to 1.5 inch-ounces (and preferably about 1.2 inch-ounces) for cartridges (as shown at 30) containing longer lengths of film (e.g., 200 feet or greater) due to the increased mass of the film to be advanced, increased frictional forces, and different cartridge characteristics which are present with the larger film cartridges. To provide the increased driving force required for the larger capacity cartridges as well as the smaller force preferred for the smaller capacity cartridges, a force controlling mechanism 70 of the present invention is incorporated into the drive mechanism 40.

Mechanism 70 includes a friction increasing or pressure member 72 of generally tubular shape. One end of the member 72 is closed and bears against clutch member 64. The other end of member 72 is open and is telescopically received in an open end of a generally tubular sensing or detecting member 74. The other end of sensing member is closed and is adapted to bear against the bottom of the recessed position 32d of the film drive members. The members 72 and 74 are offset from the axis of rotation of gear 60 so that they travel in an eccentric path. They are located about the same distance from the axis of rotation X of gear 60 as the lug 42, and (as shown in FIG. 4), they are spaced about 150°–170° from the lugs. Thus, when the lug 42 is in driving engagement with one of the lugs 32a or 32b, the mechanism 70 is spaced from the other lug on the cartridge. A coil spring 76 is positioned within members 72 and 74. The spring bears against the closed ends of these members and urges them in opposite directions towards an extended (FIG. 3) position relative to each other wherein they are displaced along their common central axis X'. The axes X and X' are substantially parallel to each other.

Figure 2:
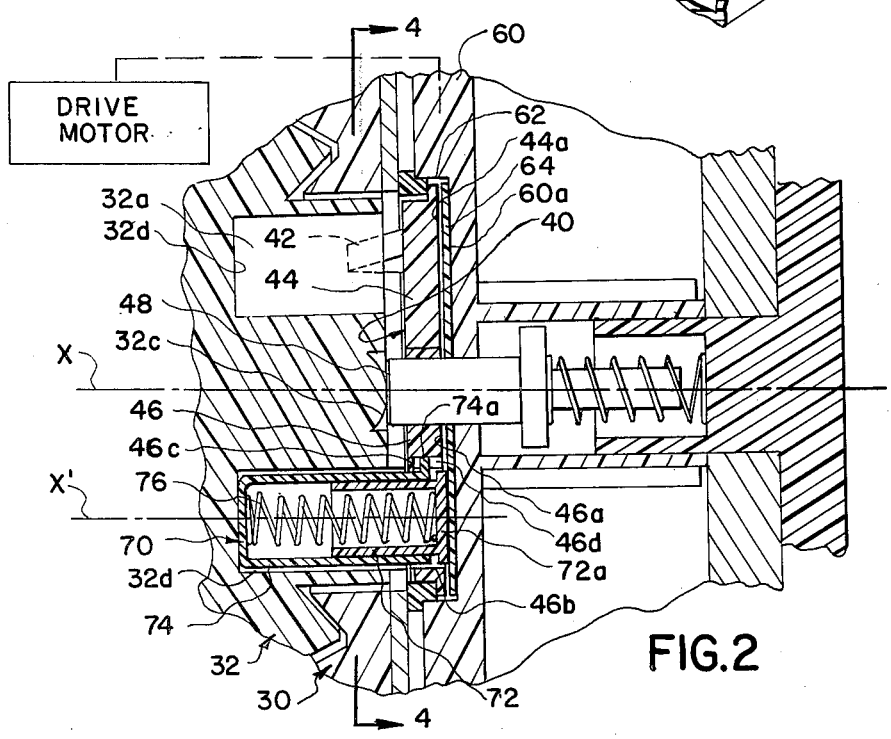
FIG. 2 is an enlarged, fragmentary cross-section view showing a drive mechanism of the present invention cooperating with a received film cartridge such that a sensing portion of the mechanism is depressed into the position for providing a relatively high driving force.
Figure 3:
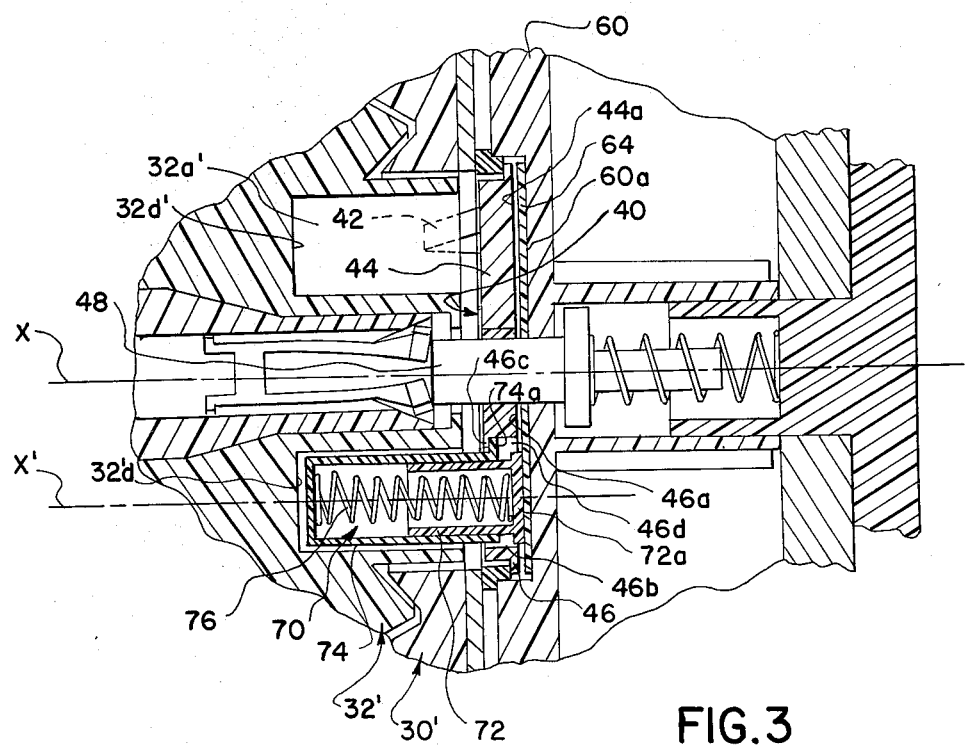
FIG. 3 is an enlarged fragmentary cross-section view, similar to FIG. 2, but showing the sensing portion of the take-up drive mechanism in an extended position which it assumes when it senses a film cartridge requiring a relatively low driving force is loaded into the camera.
Figure 4:
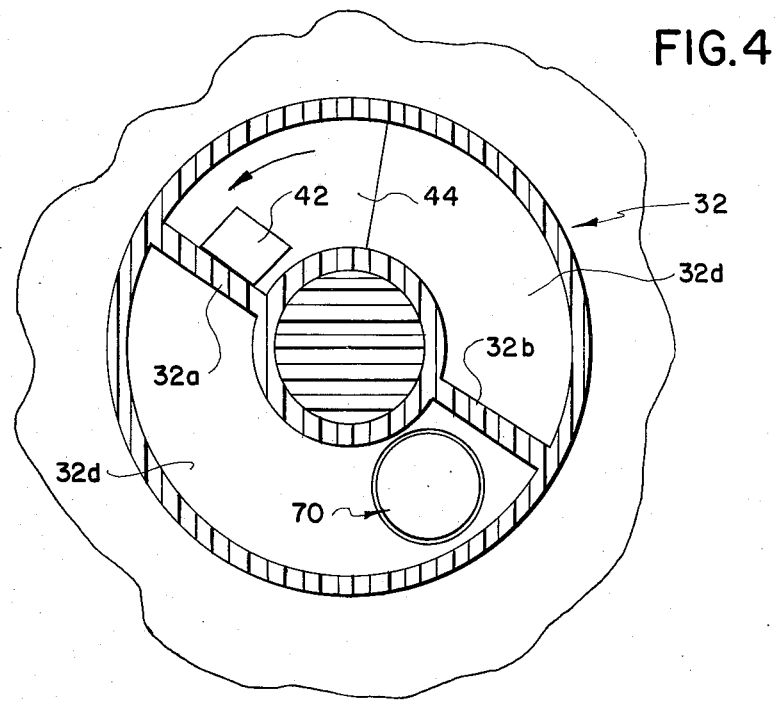
FIG. 4 is a sectional view taken along lines 4—4 of FIG. 2 showing the drive mechanism of the present invention engaged with a take-up spindle of a received film cartridge.

The detecting member 74 projects through an opening 46b in the plate 46 and is movable in a direction substantially perpendicular to the plate 46 from the FIG. 3 extended position to a depressed (FIG. 2) position. In the preferred embodiment, the detecting member 74 includes a projection 74a which contacts a tab portion 46c of the plate 46 to stop the detection member 74 and keep it from passing through the opening 46b. Projection 74a travels along a slot 46d as member 74 moves toward clutch member 64.

In FIG. 2, the detecting member 74 is shown in engagement with the portion 32d of the drive member 32 in the cartridge 30. As cartridge 30 is inserted into the cartridge chamber 12, detecting member 74 is engaged by cartridge portion 32d which urges the detecting member toward its depressed (FIG. 2) position. When in the depressed (FIG. 2) position, the coil spring 76 is compressed and bears against the detecting member 74 and the pressure member 72. The resulting force urges pressure member 72 toward the right, and increased pressure is placed upon the clutch member 64. Thus, when the detecting member 74 is held in the depressed (FIG. 2) condition by the portion 32d, the force applied by portion 72a of the pressure member 72 is effective to increase the resulting frictional force between the clutch member 64 and the surface 60a of the gear 60. As a result, there is an increased driving force transmitted to plates 44 and 46 and to the driving lug 42 when the gear 60 is driven. This, of course, increases the force applied to the cartridge drive member 32. For example, the increased friction resulting from this engagement may be sufficient to increase the driving force exerted by lug 42 onto lugs 32a, 32b from within a range of 0.5 to 1.0 inch-ounces to within a range of 1.0 to 1.5 inch-ounces.

Referring now in detail to FIG. 3, mechanism 70 is shown in driving relationship with a smaller sound film cartridge 30' of the type disclosed in U.S. Pat. application Ser. No. 248,514, entitled, FILM CARTRIDGE, filed Apr. 28, 1972, in the name of Stephen H. Miller. Cartridge 30' has a drive member 32' which can be driven by a lower torque, preferably 0.5 to 1.0 inch-ounces, and most preferably, at about 0.7 to 0.8 inch-ounces. Member 32' has a recess portion 32d' that is intentionally slightly greater in depth than a corresponding recess portion 32d in the drive member 32 of the film cartridge 30. Thus, it will be understood that the difference in depth of the recesses 32d and 32d' comprise predetermined cartridge characteristics which have a direct correlation to the amount of drive force which is to be applied to the cartridge for the preferred operation of the cartridge.

When cartridge 30' is fully inserted into the cartridge chamber 12 of the motion picture camera 10, the detecting member 74 remains in its fully extended position wherein the projection 74a is in engagement with the tab portion 46c and the coil spring 76 urges the pressure member 72 toward the fully extended position shown wherein it is in engagement with the clutch plate 64. As the spring member 76 is only slightly compressed when in the extended (FIG. 3) position, the forces which result from the engagement of the pressure member 72 contacting the clutch member 64 is nearly negligible. Because spring 76 is compressed less by cartridge 30' than by cartridge 30, member 72 is urged against clutch member 60 with less force than occurs when a cartridge 30 is sensed by mechanism 70. As shown, when a cartridge 30' is inserted into the cartridge chamber 12, the detecting member 74 remains a spaced distance from the inner end or bottom of the opening 32d', and the friction increasing mechanism 70 is thereby ineffective to alter the driving force created between the clutch member 64 and the gear 60, plate 44 and plate 46. As illustrated, the drive mechanism 40 does not interfere with normal operation of a disabling device 48 (FIG. 3), which is suitable for cooperating with an anti-backup portion of a film cartridge of the type disclosed in commonly-assigned copending U.S. Pat. application Ser. No. 323,019, entitled DISENGAGEABLE ANTI-BACKUP DEVICE FOR FILM CARTRIDGE, Filed Jan. 12, 1973 in the name of Archie J. Tucker. For further discussion of the construction and operation of the disabling mechanism 48, see commonly-assigned copending U.S. Pat. Application Ser. No. 250,352, filed May 4, 1972, entitled, DISABLING DEVICE FOR ANTI-BACKUP MECHANISM IN A FILM CARTRIDGE, in the name of Holzhauser et al., which is incorporated herein by reference.

Drive member 32' of sound cartridge 30' and the corresponding portion of a silent film cartridge of the type shown in the before-mentioned U.S. Pat. No. 3,208,686 have substantially the same dimensions so that the same drive force is applied by lug 42 to both types of the smaller-capacity cartridge. Thus, the drive mechanism of this invention is able to detect the presence of film cartridges of different types due to the difference in the depth of the recessed portions 32d, 32d' of the different cartridges which varies or controls the mechanism 70. The configuration of the drive members 32, 32' are similar so that the driving force from the camera lugs 42 can be applied in the same manner, i.e., by contacting lugs 32a and 32b. For a small sound cartridge 30' and the similar silent cartridge shown in U.S. Pat. No. 3,208,686, the members 32' comprise part of the take-up core for the take-up chamber of the cartridge. For larger-capacity cartridges 30 as disclosed in the before-mentioned copending patent application, the drive member 32 may be located outside the take-up chamber and be used for advancing film along a path between the film supply and the film take-up in the cartridge. Of course, the operation of the camera drive mechanism is not determined by the location in the cartridges of drive members 32 or 32' but, instead, is a function of the depression (or extension) or mechanism 70 as determined by the depth of recesses 32d and 32d'.

It should be understood from the Specification that a drive mechanism of the present invention is suitable for providing a wide range of driving forces by selecting different sizes and materials to be used in the drive components and also by controlling the dimensions and placement of the friction increasing mechanism. Thus, while the invention has been described in detail with particular reference to a preferred embodiment thereof and its use with two different types of cartridges, other variations and modifications can be effected within the spirit and scope of the invention.

I claim:

1. In a motion picture camera adapted to receive either (1) a cartridge having means indicating that the cartridge is of a first type having a film advancing portion requiring application of a first driving force by the camera or (2) a cartridge having means indicating that the cartridge is of a second type having a film advancing portion requiring the application of a second and larger driving force by the camera, the improvement comprising:
   a. first means supported by said motion picture camera for being rotatably driven about an axis; and
   b. second means frictionally coupled to said first means, said second means being movable in a direction generally parallel to said axis responsive to the means indicating the type of film cartridge received for adjusting said frictional coupling between said first and second means such that said second means transmits to said film advancing portion (1) the first driving force when a cartridge of the first type is sensed or (2) the second driving force when a cartridge of the second type is sensed.

2. The improvement as set forth in claim 1 wherein said second means includes:

a. a pressure member supported in position for cooperating with said first means, said pressure member being movable in a direction generally parallel to said axis between (1) a first position and (2) a second position, said pressure member when in its second position being effective to adjust the frictional coupling between said first and second means so that said second means applies the second driving force to the film advancing portion of the cartridge;

b. a detecting member for sensing the means indicating the type of cartridge received, said detecting member being mounted for movement (1) to an extended position in response to receipt of the first type of cartridge in the camera and (2) to a depressed position in response to receipt of the second type of cartridge in the camera; and c. resilient means operatively coupling said pressure member and said detecting member so that movement of said detecting member to its extended position permits said pressure member to remain in said first position and so that movement of said detecting member to its depressed position moves said pressure member to said second position.

3. In a motion picture camera having drive means and being adapted to receive film cartridges having code means indicating the force required for driving a film advancing portion of the cartridge, the combination comprising:

a. a friction clutch having a first portion adapted to be rotatably driven by the camera drive means and having a second portion adjustably and frictionally coupled to said first portion, said second portion being adapted to apply a driving force to the film advancing portion of a cartridge, the driving force transmitted by said second portion being a function of the frictional force created between said first and second portions;

b. detection means for sensing the means on the cartridge indicating the required driving force, said detection means being movable between (1) an extended condition and (2) a depressed condition; and c. pressure means coupled to said friction clutch for adjusting the driving force transmitted by said friction clutch to a cartridge in response to movement of said detection means, said pressure member being movable (1) to a first condition when said detection means is moved to said extended condition wherein said friction clutch is effective to supply a first driving force and (2) to a second condition when said detection means increases the frictional force created between said first and second portions such that said friction clutch applies a second driving force which is greater than said first driving force.

4. In a motion picture camera having drive means and adapted to receive either (1) a cartridge having means indicating that the cartridge is of a first type having a film advancing portion requiring application of a first driving force by the camera or (2) a cartridge having means indicating that the cartridge is of a second type having a film advancing portion requiring application of a second and greater driving force by the camera, the improvement comprising:

a. a friction clutch adjustable for selectively applying either the first driving force or the second driving force to the film advancing portion of a received cartridge, said friction clutch comprising:

i. a first member supported by the camera in a position to be rotatably driven by the drive means; and ii. a second member adjustably and frictionally coupled to said first member for applying the first or the second driving force to the film advancing portion of the cartridge, said driving force being a function of the frictional force created between said first and second portions;

b. friction increasing means for adjusting said friction clutch to apply the first driving force to the film advancing portion of the cartridge when a first type of cartridge is received by the camera and to apply the second driving force to the film advancing portion of the cartridge when a second type of cartridge is received by the camera, said friction increasing means comprising:

i. sensing means for cooperating with the means of a cartridge indicating that the cartridge is of a first or second type, said sensing means being movable between
   1. an extended condition, and
   2. a depressed condition; and ii. pressure means coupled to said friction clutch for adjusting the driving force transmitted by said friction clutch responsive to said movement of said sensing means, said pressure means being movable (1) to a first condition when said sensing means is moved to said extended condition wherein said friction clutch is effective to supply the first driving force and (2) to a second condition when said sensing means is moved to said depressed condition whereby said sensing means increases the frictional force created between said first and second members of said clutch such that said friction clutch applies the second driving force to a cartridge.

5. A motion picture camera having a plurality of walls defining a portion of a cartridge chamber adapted to receive either (1) a first cartridge having a film advancing member requiring a first driving force for advancing a film strip supported by the cartridge and having an indicia indicating that the first force is required or (2) a second cartridge having a film advancing member requiring a second and larger driving force for advancing the film supported by the cartridge and having an indicia indicating that the second force is required, said camera comprising:

a. a drive member supported by one of the plurality of walls for rotation about an axis, said drive member being engageable with the film advancing member of a received cartridge for supplying either the first or second driving force to the film advancing portion of a received cartridge;

b. drive means rotatably supported in the camera at a spaced distance from said drive member;

c. friction means positioned between said drive member and said drive means and frictionally coupling said drive member and said drive means for transmitting a force to said drive member from said drive means;

d. first means supported by said drive member in a position displaced from said axis, said first means for engaging said friction means for increasing the driving force transmitted to said drive member by said drive means through said friction means, said first means being movable between (1) a first position wherein the first force is supplied to the film advancing member of a received first cartridge and (2) a second position wherein the second force is supplied to the film advancing member of a received second cartridge;

e. second means associated with said first means, said second means for cooperating with the indicia to determine whether the first or the second force is required for advancing the film, said second member being movable between (1) a first position when it is in contact with a first cartridge and (2) a second position when it is in contact with said second cartridge; and f. third means coupling said first and second means, said means suitable for moving said first means to its second position responsive to said second means being moved to its second position.

6. A motion picture camera as set forth in claim 5 wherein (1) said first means is substantially a tubular-shaped member having an end portion engageable with said friction means, said first means being supported for movement between said first and second positions by said drive member, (2) said second means is substantially a tubular-shaped member adapted to cooperate with said first means in a telescopic fashion and (3) said third means comprises a coil spring interposed between said first and second means.

7. In a motion picture camera adapted to receive a film cartridge having means indicating the cartridge is either a first type having a film advancing portion requiring application of a first driving force or a second type having a film advancing portion requiring the application of a second and larger driving force, the improvement comprising:

a. first means for selectively applying either the first or the second driving force to the film advancing portion of a received cartridge, said first means including a first member rotatably supported by said motion picture camera, a second member rotatably and eccentrically supported with respect to said first member, said second member being engageable with the film advancing portion of the received film cartridge to apply the first or second driving force to the film advancing portion of the cartridge, and a third member frictionally coupling said first and second members; and b. second means for cooperating with the indicating means of a received film cartridge for adjusting said first means to apply the first driving force when a cartridge of the first type is sensed or the second driving force when a cartridge of the second type is sensed, said second means including a pressure member adapted to cooperate through said third member to change the frictional coupling between said first and second members, a detecting member for sensing the means indicating the type of cartridge, said detecting member being movable to an extended position when the first type of cartridge is received in the camera and to a depressed position when the second type of cartridge is received in the camera, and resilient means coupling said pressure member and said detecting member so that movement of said detecting member to its extended position permits said pressure member to remain in said first position and so that movement of said detecting member to its depressed position moves said pressure member to its second position.

8. For a motion picture camera, drive means adapted to provide a driving force to a film advancing portion of a received cartridge responsive to indicating means of the cartridge, said drive means comprising:

a. first means supported by said apparatus, said first means adapted to be rotatably driven about an axis; and b. second means for transmitting the driving force to the film advancing portion of a received film cartridge, said second means being frictionally coupled to said first means and being displaceable responsive to the indicating means of a received cartridge in a direction generally parallel to said axis for altering the frictional coupling between said first and second means thereby controlling the driving force provided to the film advancing portion of the cartridge.

9. The drive means as set forth in claim 8 wherein said second means includes:

a. a pressure member adapted to be displaceable in a direction generally parallel to said axis of rotation to cooperate with said first means to alter the frictional coupling between said first and second means;

b. sensing means for cooperating with the indicating means of a received film cartridge and being displaceable thereby between an extended position and a depressed position; and c. resilient means coupling said pressure member and said sensing means such that movement of said sensing means from its extended position to its depressed position changes said pressure member from a first condition wherein a first frictional coupling is created between said first and second means and a second condition wherein a different frictional coupling is created between said first and second means.

10. In a motion picture camera adapted to receive a film cartridge having means indicating the driving force required by a film advancing portion of the cartridge for advancing a film strip in the cartridge, drive means comprising:

a. first means supported by said camera for rotation about an axis;

b. second means adapted to be frictionally engageable with said first means, said second means being displaceable in a direction parallel to said axis between a first condition wherein a first level of force is created between said first and second means and a second condition wherein a second and different level of force is created between said first and second means; and c. third means coupled to said second means for transmitting a driving force to the film advancing portion of a received cartridge, said driving force being directly proportional to the level of force created between said first and second means.

* * * * *